US012706265B2

(12) United States Patent
Chen et al.

(10) Patent No.: US 12,706,265 B2
(45) Date of Patent: Aug. 11, 2026

(54) ELASTIC MEMBER AND RELAY

(71) Applicant: Tyco Electronics (Shanghai) Co., Ltd., Shanghai (CN)

(72) Inventors: Jun (Tod) Chen, Shenzhen (CN); Shixiong (Stephen) Cao, Shenzhen (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 243 days.

(21) Appl. No.: 18/541,026

(22) Filed: Dec. 15, 2023

(65) Prior Publication Data

US 2024/0203678 A1 Jun. 20, 2024

(30) Foreign Application Priority Data

Dec. 16, 2022 (CN) ........................ 202211622725.5

(51) Int. Cl.

*H01H 50/56* (2006.01)
*H01H 50/14* (2006.01)
*H01H 50/54* (2006.01)

(52) U.S. Cl.

CPC ............ *H01H 50/56* (2013.01); *H01H 50/14* (2013.01); *H01H 50/541* (2013.01)

(58) Field of Classification Search

CPC ...... H01H 50/56; H01H 50/14; H01H 50/541; H01H 1/50; H01H 1/54; H01H 50/546; H01H 1/24
USPC ........................................................... 335/83
See application file for complete search history.

(56) References Cited

U.S. PATENT DOCUMENTS 2,666,113 A * 1/1954 Kuhnke ................. H01H 50/20 335/131
4,405,848 A * 9/1983 Jaegle ...................... H01H 1/24 200/243
10,403,460 B2 * 9/2019 Daikoku ................ H01H 50/58
2019/0304725 A1 * 10/2019 Minowa ................. H01H 50/36
2019/0304727 A1 * 10/2019 Minowa ............... H01H 50/546
2022/0093355 A1 * 3/2022 Hayashida ............. H01H 1/502
2022/0122793 A1 * 4/2022 Miyake .................. H01H 50/14
2022/0122797 A1 * 4/2022 Miyake ................ H01H 50/546
2022/0230827 A1 * 7/2022 Yoo ........................ H01H 49/00
2022/0293374 A1 * 9/2022 Tsukada ................. H01H 50/20
2022/0336177 A1 * 10/2022 Park ....................... H01H 50/60
2023/0119728 A1 * 4/2023 Takahashi .............. H01H 50/14 335/108
2023/0386769 A1 * 11/2023 Murota .................. H01H 23/30
2023/0420194 A1 * 12/2023 Singh ....................... H01H 5/10
2023/0420206 A1 * 12/2023 Chen .................... H01H 50/641
(Continued)

FOREIGN PATENT DOCUMENTS

CN 106710899 A * 5/2017

*Primary Examiner* — Shawki S Ismail
*Assistant Examiner* — Lisa N Homza
(74) *Attorney, Agent, or Firm* — Barley Snyder

(57) ABSTRACT

An elastic member adapted to apply a contact pressure to a movable terminal of a relay includes a fixed part and a pair of elastic arms. The fixed part is adapted to be fixed to a movable seat of the relay. The pair of elastic arms are connected to respective sides of the fixed part and extend obliquely therefrom. End parts of the pair of elastic arms are adapted to abut against two ends of the movable terminal of the relay and apply a predetermined contact pressure thereon.

19 Claims, 19 Drawing Sheets

(56) References Cited

U.S. PATENT DOCUMENTS

| | | | | |
|---|---|---|---|---|
| 2024/0203675 | A1* | 6/2024 | Chen | H01H 50/14 |
| 2024/0282539 | A1* | 8/2024 | Zhong | H01H 50/02 |

* cited by examiner

ELASTIC MEMBER AND RELAY

CROSS-REFERENCE TO RELATED APPLICATION

This application claims the benefit of Chinese Patent Application No. CN202211622725.5 filed on Dec. 16, 2022, in the State Intellectual Property Office of China, the whole disclosure of which is incorporated herein by reference.

FIELD OF THE INVENTION

The present invention relates to an elastic member for a relay, and a relay including the elastic member.

BACKGROUND

In the prior art, a contact spring of a relay is usually located in the middle of a movable terminal and applies a predetermined contact pressure to the middle of the movable terminal. However, the two movable contacts of the movable terminal are located at both ends of the movable terminal, rather than in the middle of the movable terminal, which can cause the movable contact to rebound during the connection, thus disconnecting the movable terminal and the static terminal. In addition, in the prior art, when the movable and static contacts are fused together, they cannot be separated in a timely manner, resulting in the inability to disconnect the main circuit in a timely manner, which reduces the safety and reliability of the relay. Further, when the movable and static contacts of the relay come into contact and carry short-circuit current, a Hohm repulsion force between the movable and static contacts increases with the increase of short-circuit current. The electromagnetic attraction generated by the coil system cannot overcome the Hom repulsion. This can cause the movable contact to bounce, resulting in the movable and static contacts being fused together by an electric arc therebetween.

SUMMARY

According to an embodiment of the present disclosure, an elastic member adapted to apply a contact pressure to a movable terminal of a relay includes a fixed part and a pair of elastic arms. The fixed part is adapted to be fixed to a movable seat of the relay. The pair of elastic arms are connected to respective sides of the fixed part and extend obliquely therefrom. End parts of the pair of elastic arms are adapted to abut against two ends of the movable terminal of the relay and apply a predetermined contact pressure thereon.

BRIEF DESCRIPTION OF THE DRAWINGS

The invention will now be described by way of example with reference to the accompanying Figures, of which.

DETAILED DESCRIPTION OF THE EMBODIMENTS

Figure 1:
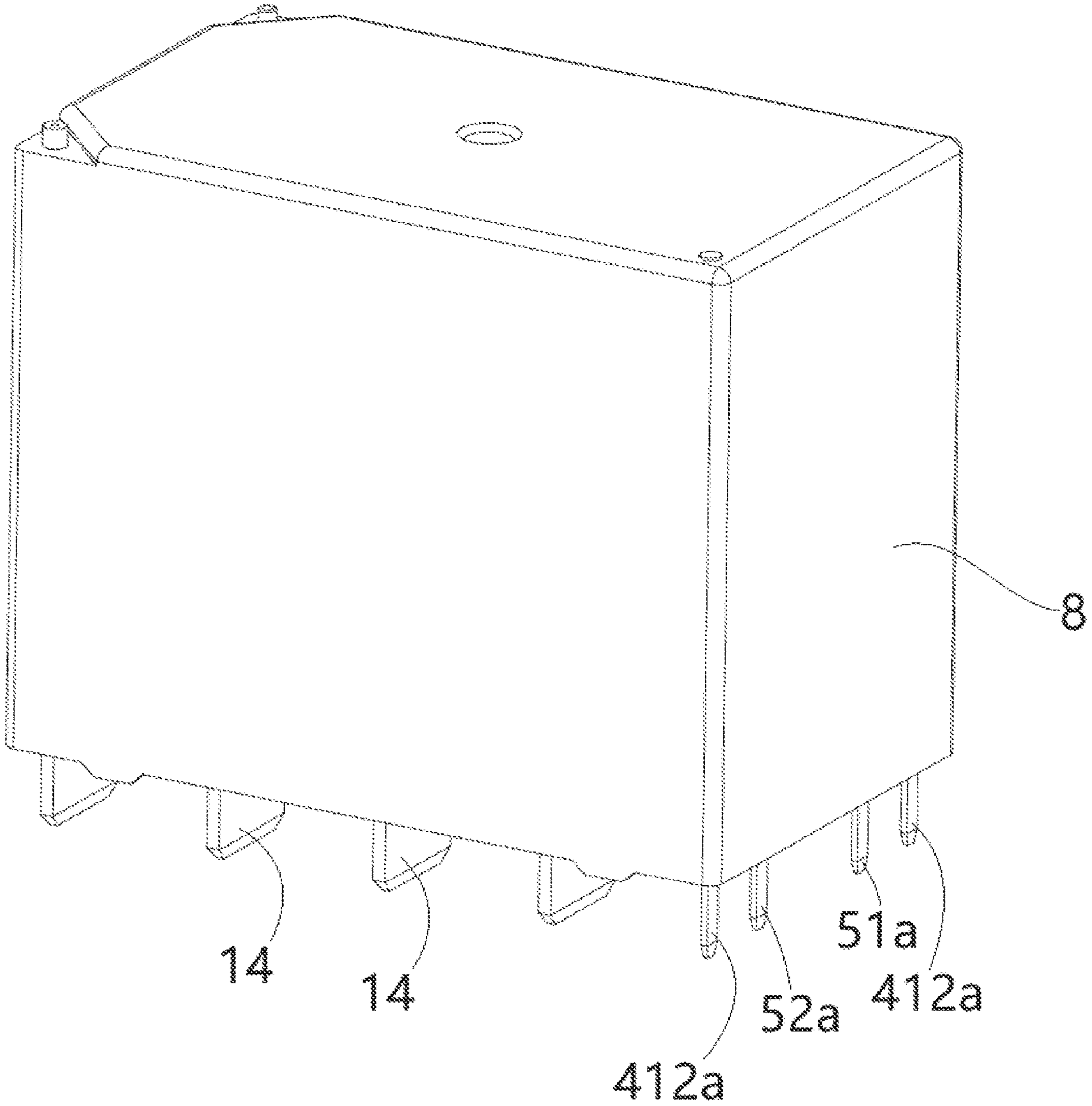
FIG. 1 is an illustrative perspective view of a relay according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present invention, an elastic member for applying a contact pressure to a movable terminal of a relay includes a fixed part which is used to be fixed to a movable seat of the relay, and a pair of elastic arms which are respectively connected to both sides of the fixed part. The pair of elastic arms extend a predetermined length by tilting forward or extending obliquely from both sides of the fixed part, so that the elastic member is in a herringbone or V-shaped. The end parts of the pair of elastic arms are used to respectively lean or abut against the two ends of the movable terminal of the relay, in order to apply a predetermined contact pressure on each of two ends of the movable terminal.

According to another embodiment of the present disclosure, a relay comprises the above elastic member, a terminal assembly, a fixed seat, and a moveable seat. The terminal assembly includes a movable terminal and a pair of static terminals symmetrically arranged at both ends of the movable terminal. The static terminal is fixed on the fixed seat, and the movable seat is movably installed on the fixed seat and is capable of being moved back and forth in a first direction relative to the fixed seat. The movable terminal and the elastic member are installed on the movable seat. The elastic member is compressed between the movable seat and the movable terminal, so that the movable terminal is floatable in the first direction relative to the movable seat.

According to another embodiment of the present disclosure, a relay static terminal comprises a static terminal body, a static contact, and an electrical connection part. The static terminal body is in an “n” shape and comprises a first side plate; a second side plate which is spaced from and opposite to the first side plate; and a third side plate connected between the first side plate and the second side plate. The static contact is fixed on the first side plate. The electrical connection part extends downwards from the bottom of the second side plate and is used for electrical connection to a main circuit. The first side plate, the second side plate and the third side plate of the static terminal body define an accommodation space, and the static contact is used for electrical contact with a movable contact of a movable terminal located in the accommodation space.

According to another embodiment of the present disclosure, a terminal assembly comprises a movable terminal and two above relay static terminals. The movable terminal comprises a movable terminal body, and two movable contacts which are respectively fixed on both ends of the movable terminal body. The two static terminals are symmetrically arranged at both ends of the movable terminal body. The two movable contacts are respectively located in the accommodation spaces of the two static terminals and respectively face the static contacts of the two static terminals.

According to another embodiment of the present disclosure, a relay comprises the above terminal assembly, a fixed seat, a movable seat which is movably installed on the fixed seat and is movable back and forth in a first direction relative to the fixed seat, and an elastic member which is installed on the movable seat. The static terminal is fixed to the fixed seat, and the elastic member is compressed between the movable seat and the movable terminal. In this way, the movable terminal is floatable in the first direction relative to the movable seat.

Figure 6:
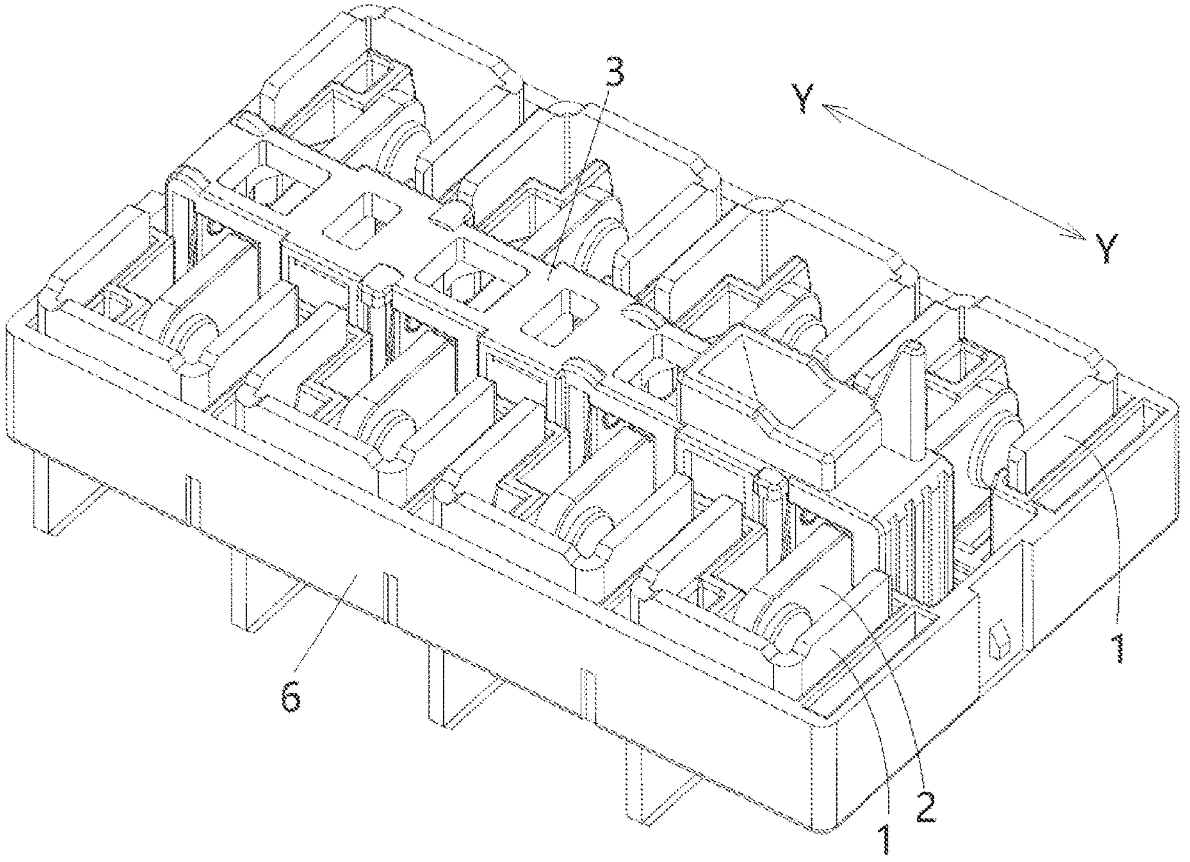
FIG. 6 is an illustrative perspective view of a fixed seat, a movable seat, a terminal assembly, and an elastic member of a relay according to an exemplary embodiment of the present invention.
Figure 7:
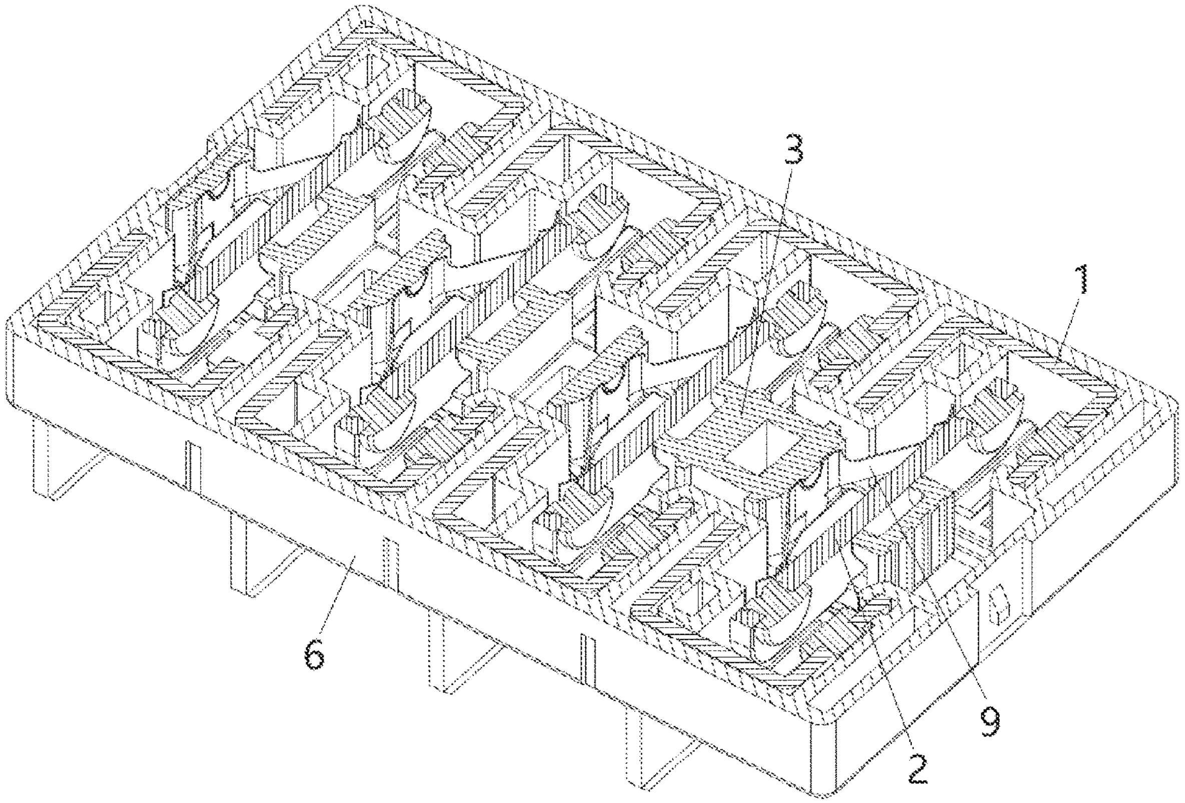
FIG. 7 is a cross-sectional view of a fixed seat, a movable seat, a terminal assembly, and an elastic member of a relay according to an exemplary embodiment of the present invention.
Figure 8:
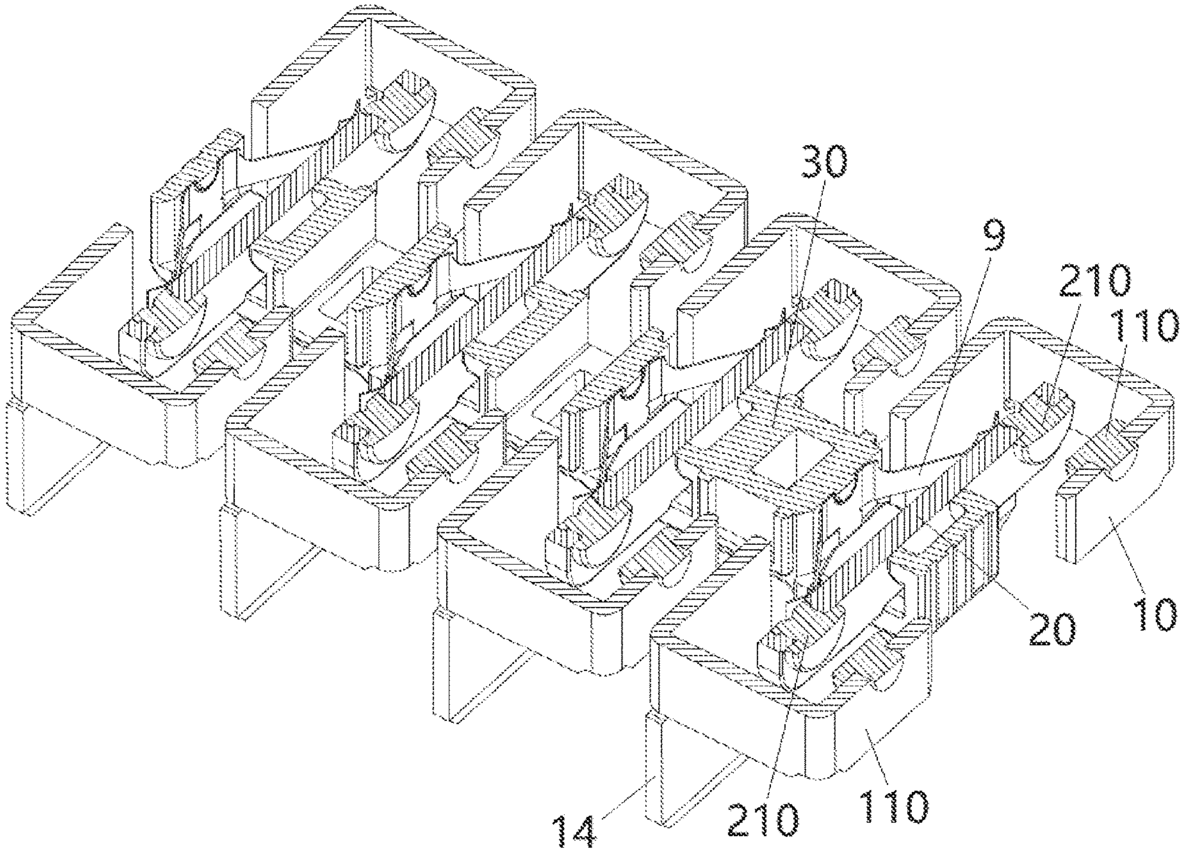
FIG. 8 is a cross-sectional view of a movable seat, a terminal assembly, and an elastic member of a relay according to an exemplary embodiment of the present invention.
Figure 9:
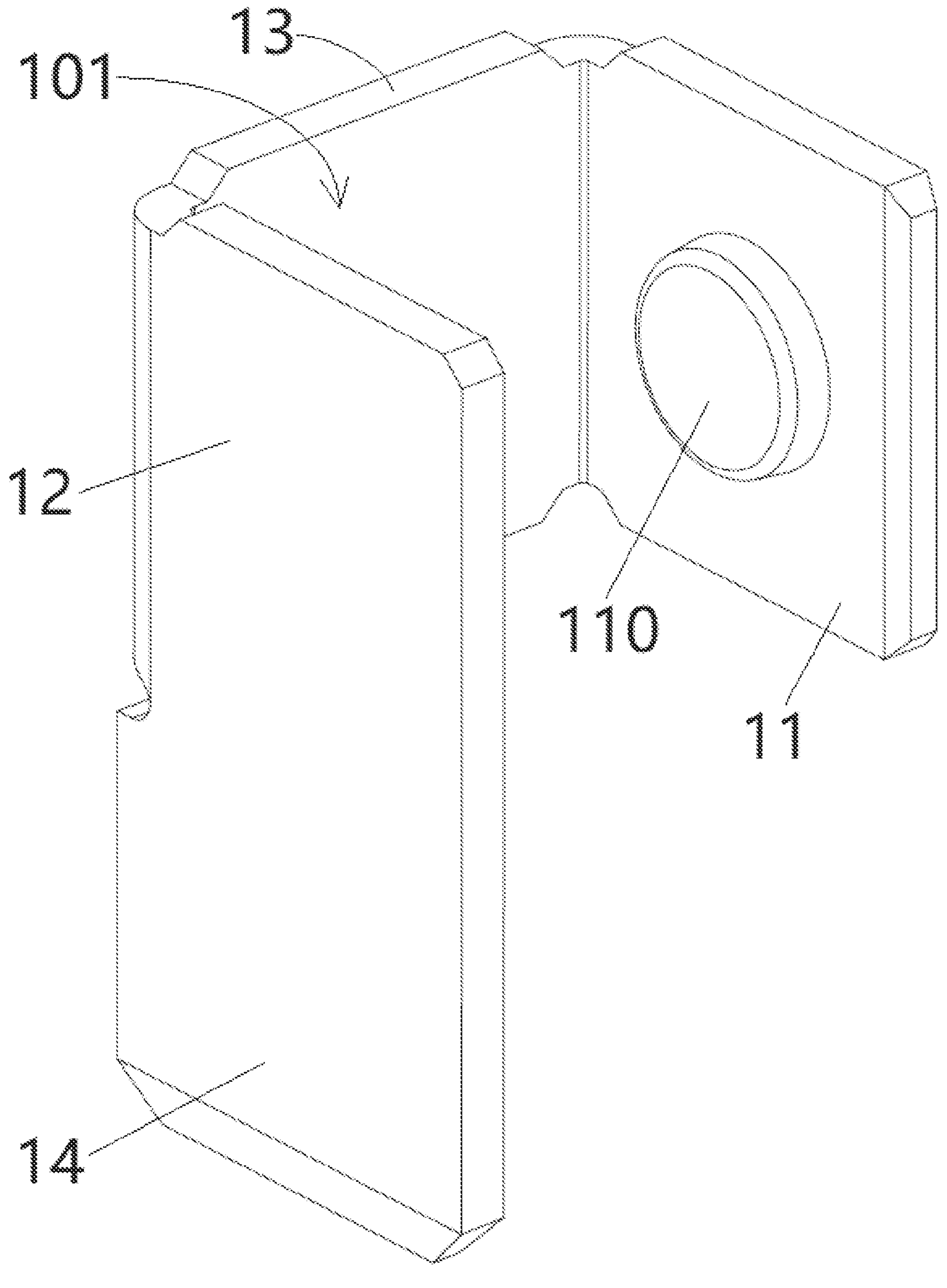
FIG. 9 is an illustrative perspective view of a static terminal of a relay according to an exemplary embodiment of the present invention.

FIG. 6 shows an illustrative perspective view of a fixed seat 6, a movable seat 3, a terminal assembly 4, and an elastic member 9 of a relay according to an exemplary embodiment of the present invention. FIG. 7 shows a cross-sectional view of a fixed seat 6, a movable seat 3, a terminal assembly 4, and an elastic member 9 of a relay according to an exemplary embodiment of the present invention. FIG. 8 shows a cross-sectional view of a movable seat 3, a terminal assembly 1, 2, and an elastic member 9 of a relay according to an exemplary embodiment of the present invention. FIG. 9 shows an illustrative perspective view of a static terminal 1 of a relay according to an exemplary embodiment of the present invention.

As shown in FIGS. 6-9, in an exemplary embodiment of the present invention, a static terminal 1 of a relay is disclosed. The static terminal 1 includes a static terminal body 10, a static contact 110, and an electrical connection part 14. The static terminal body 10 is in an “n” shape, and includes a first side plate 11, a second side plate 12 which is spaced from and opposite to the first side plate, and a third side plate 13 connected between the first side plate and the second side plate. The static contact 110 is fixed to the first side plate 11, for example, welded or riveted thereto. The electrical connection part 14 extends downwards from the bottom of the second side plate 12 for electrical connection to a main circuit. The first side plate 11, the second side plate 12, and the third side plate 13 of the static terminal body 10 define an accommodation space 101. The static contact 110 is used for electrical contact with a movable contact 210 of a movable terminal 2 located in the accommodation space 101.

Figure 10:
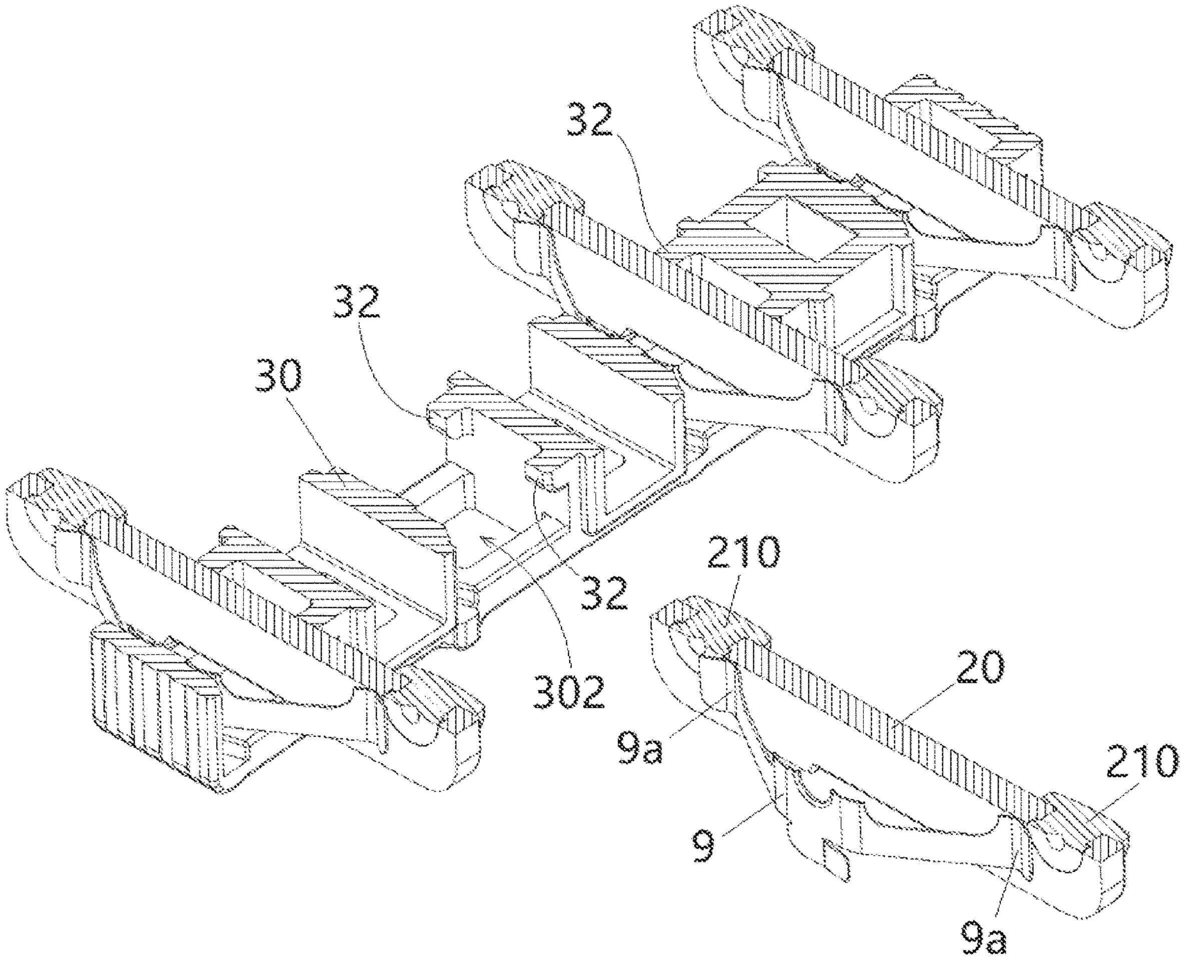
FIG. 10 is an illustrative perspective view of a movable seat, a movable terminal, and an elastic member of a relay according to an exemplary embodiment of the present invention, wherein the movable terminal and elastic member are separated from the movable seat.
Figure 11:
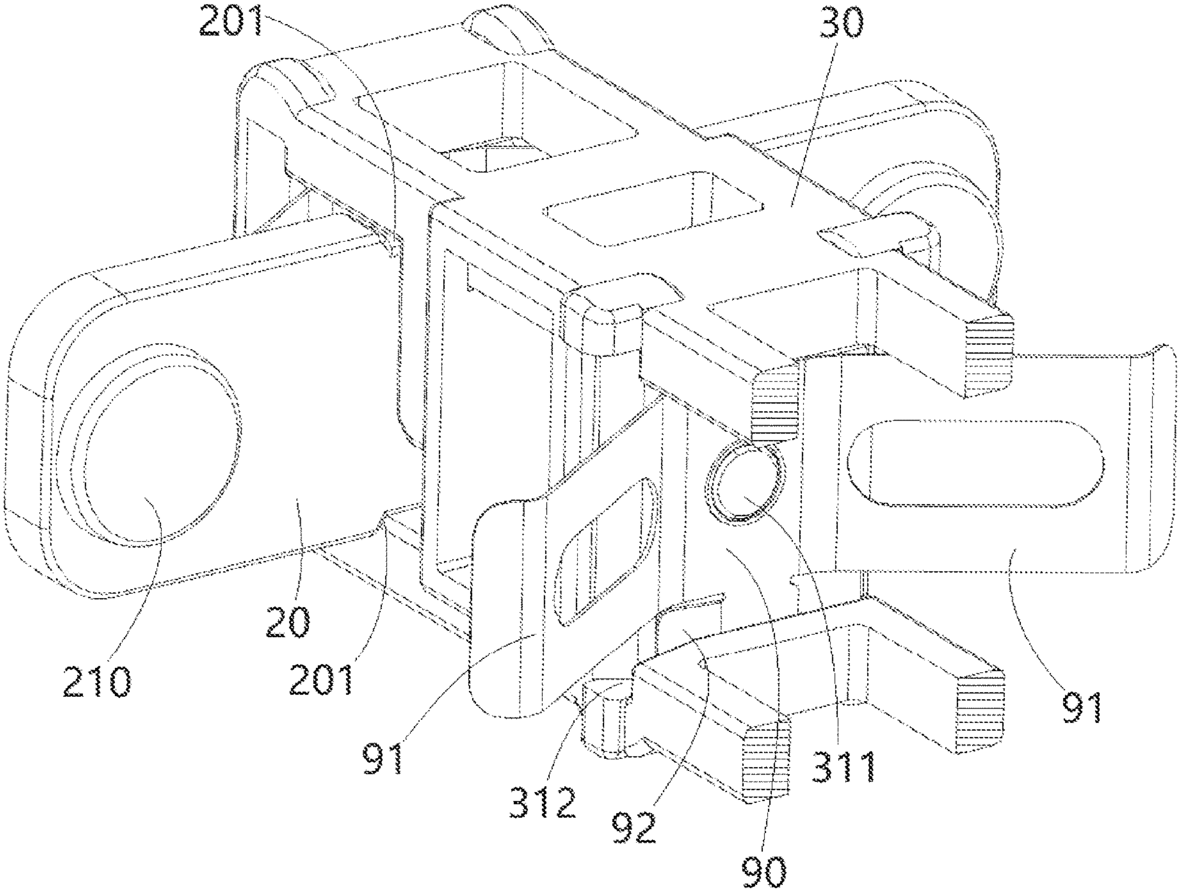
FIG. 11 is a locally enlarged view of a movable seat, a movable terminal, and an elastic member of a relay according to an exemplary embodiment of the present invention.
Figure 12:
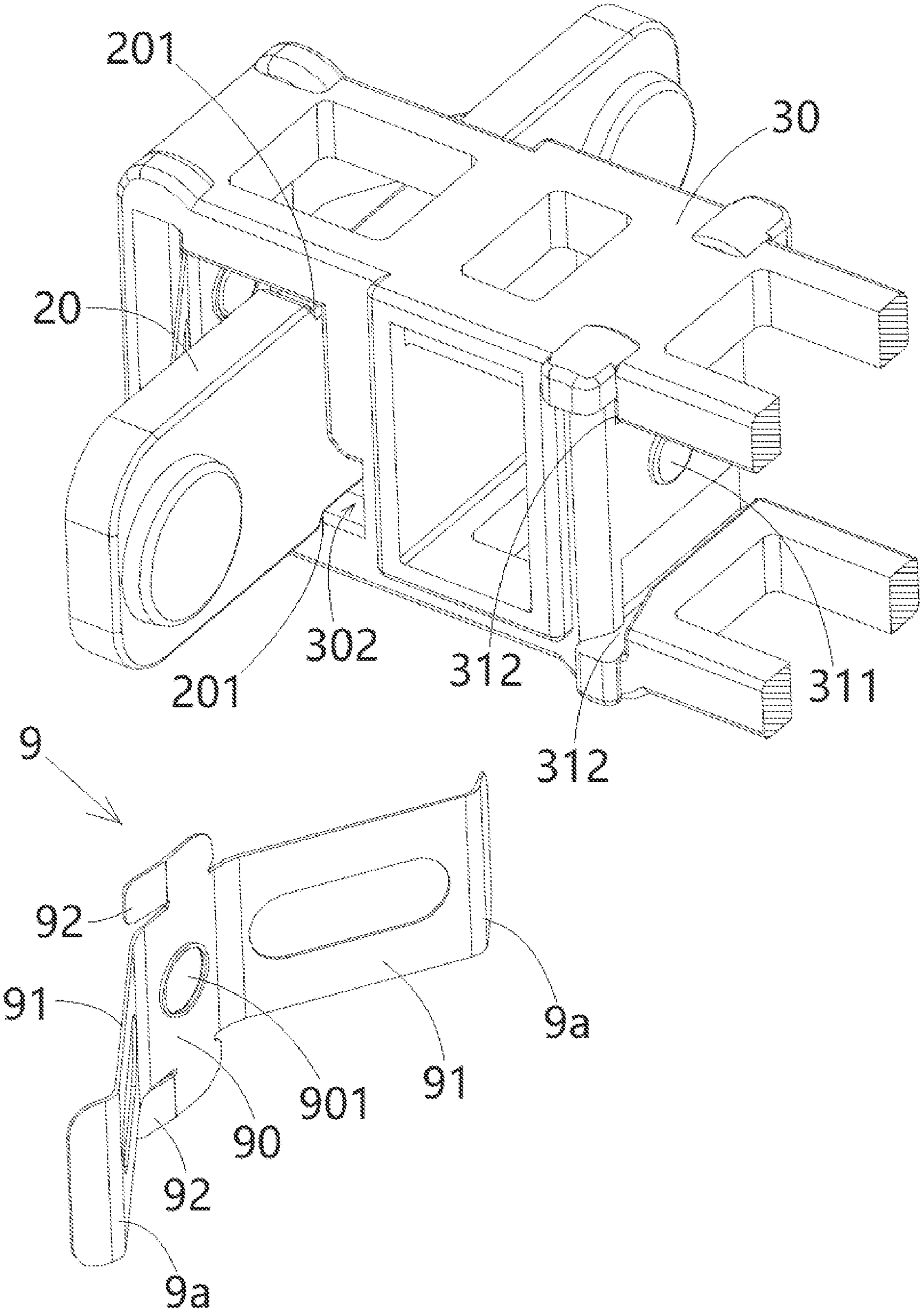
FIG. 12 is a partially enlarged view of a movable seat, a movable terminal, and an elastic member of a relay according to an exemplary embodiment of the present invention, wherein the elastic member is separated from the movable seat.
Figure 13:
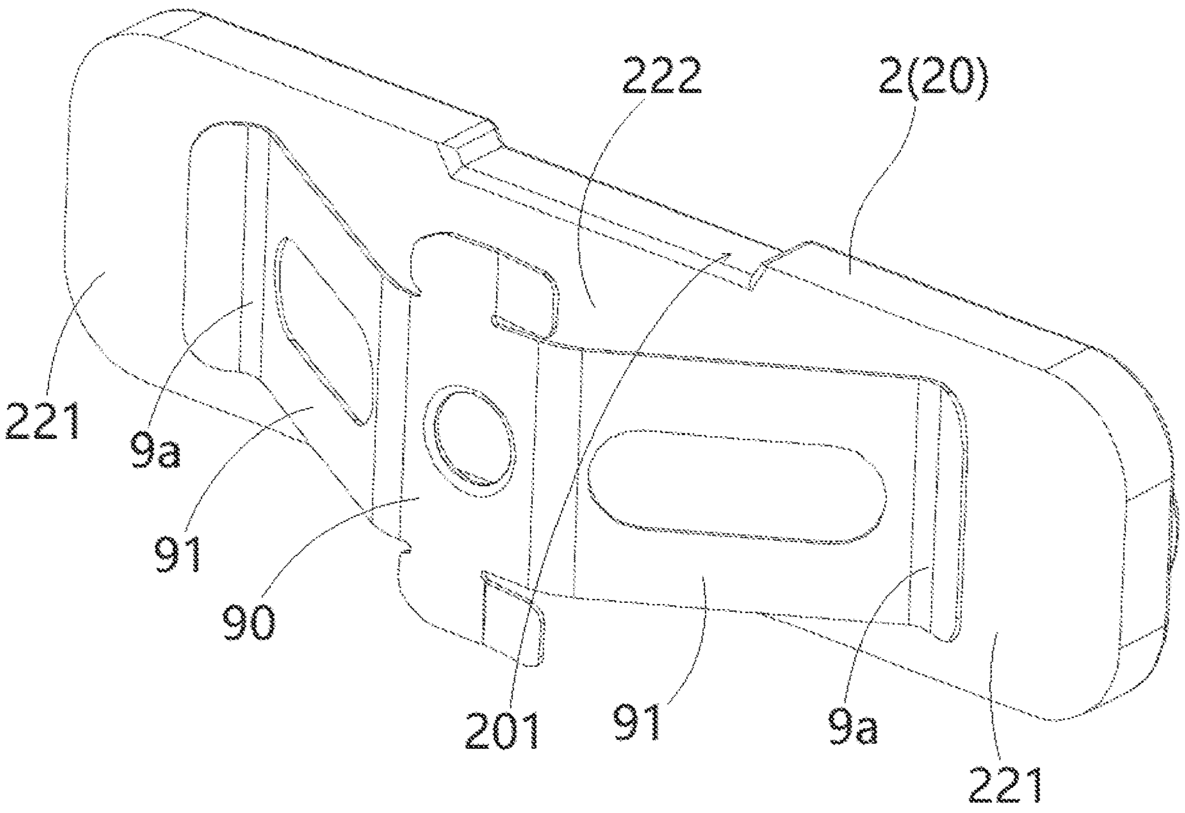
FIG. 13 is an illustrative perspective view of a movable terminal and an elastic member of a relay according to an exemplary embodiment of the present invention.

FIG. 10 is an illustrative perspective view of a movable seat 3, a movable terminal 2, and an elastic member 9 of a relay according to an exemplary embodiment of the present invention, wherein the movable terminal 2 and elastic member 9 are separated from the movable seat 3. FIG. 11 is a partially enlarged view of a movable seat 3, a movable terminal 2, and an elastic member 9 of a relay according to an exemplary embodiment of the present invention. FIG. 12 is a partially enlarged view of a movable seat 3, a movable terminal 2, and an elastic member 9 of a relay according to an exemplary embodiment of the present invention, wherein one elastic member 9 is separated from the movable seat 3. FIG. 13 is an illustrative perspective view of a movable terminal 2 and an elastic member 9 of a relay according to an exemplary embodiment of the present invention.

As shown in FIGS. 6-13, in another exemplary embodiment of the present invention, the terminal assembly 1, 2 for a relay is disclosed. The terminal assembly 1, 2 includes a movable terminal 2 and two static terminals 1. The movable terminal 2 includes the movable terminal body 20 and two movable contacts 210. Two movable contacts 210 are fixed to both ends of the movable terminal body 20, for example, welded or riveted to both ends of the movable terminal body. Two static terminals 1 are symmetrically arranged at both ends of the movable terminal body 20. The two movable contacts 210 are respectively located in the accommodation spaces 101 of the two static terminals 1 and respectively face the static contacts 110 of the two static terminals 1.

Figure 2:
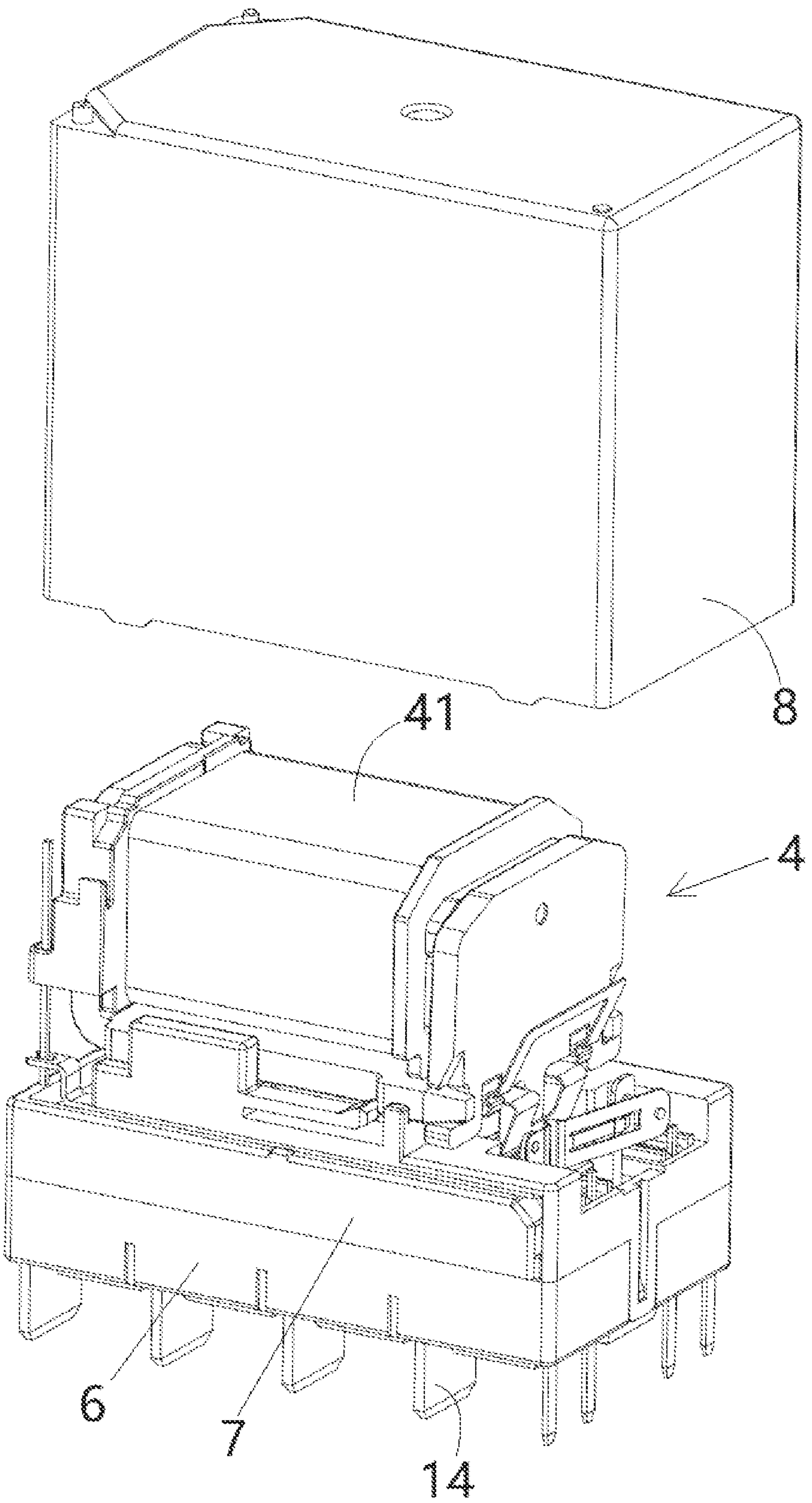
FIG. 2 is an illustrative perspective view of a relay according to an exemplary embodiment of the present invention, wherein the housing is opened.
Figure 3:
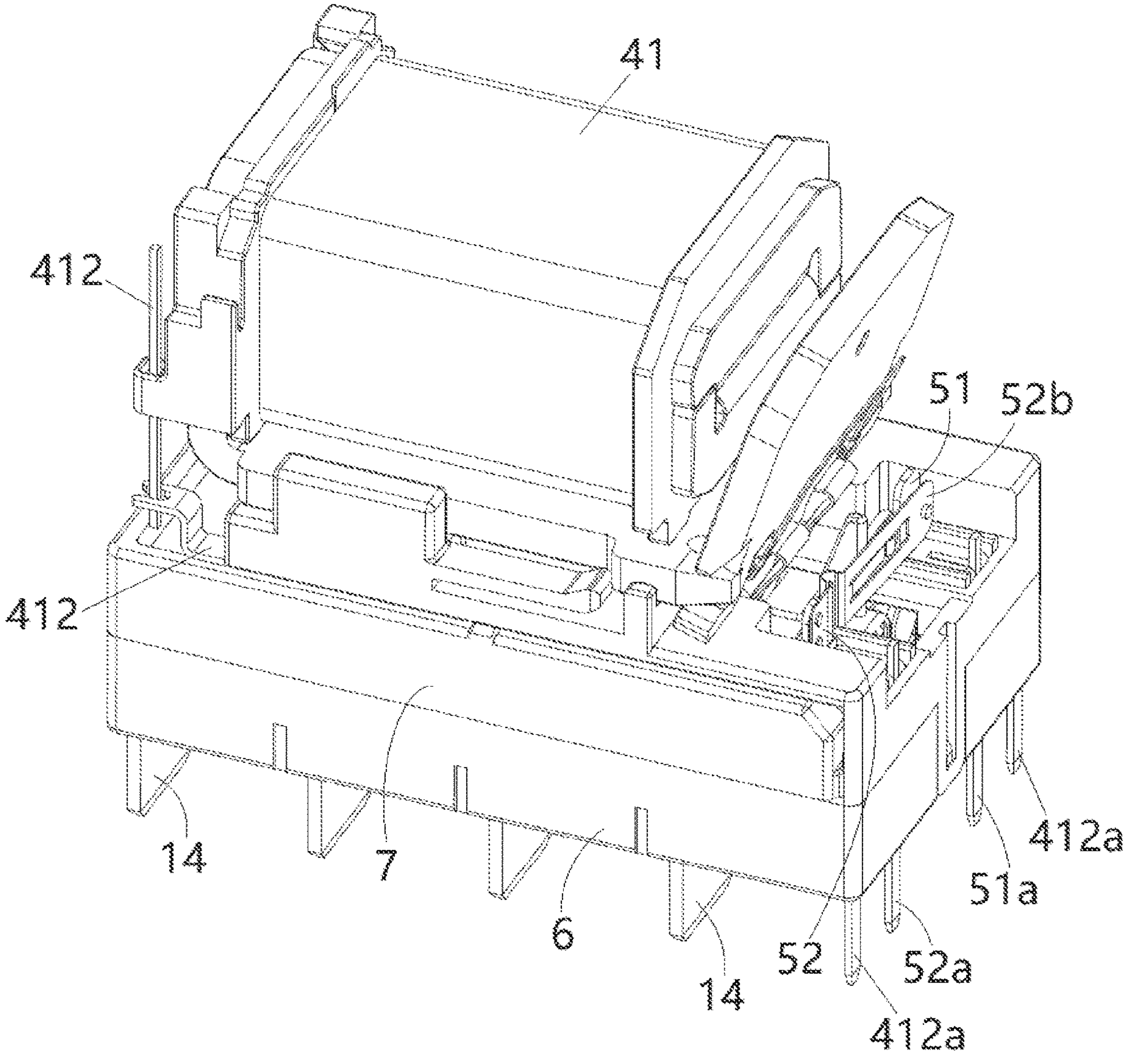
FIG. 3 is an illustrative perspective view of a relay according to an exemplary embodiment of the present invention, wherein the housing is removed.
Figure 4:
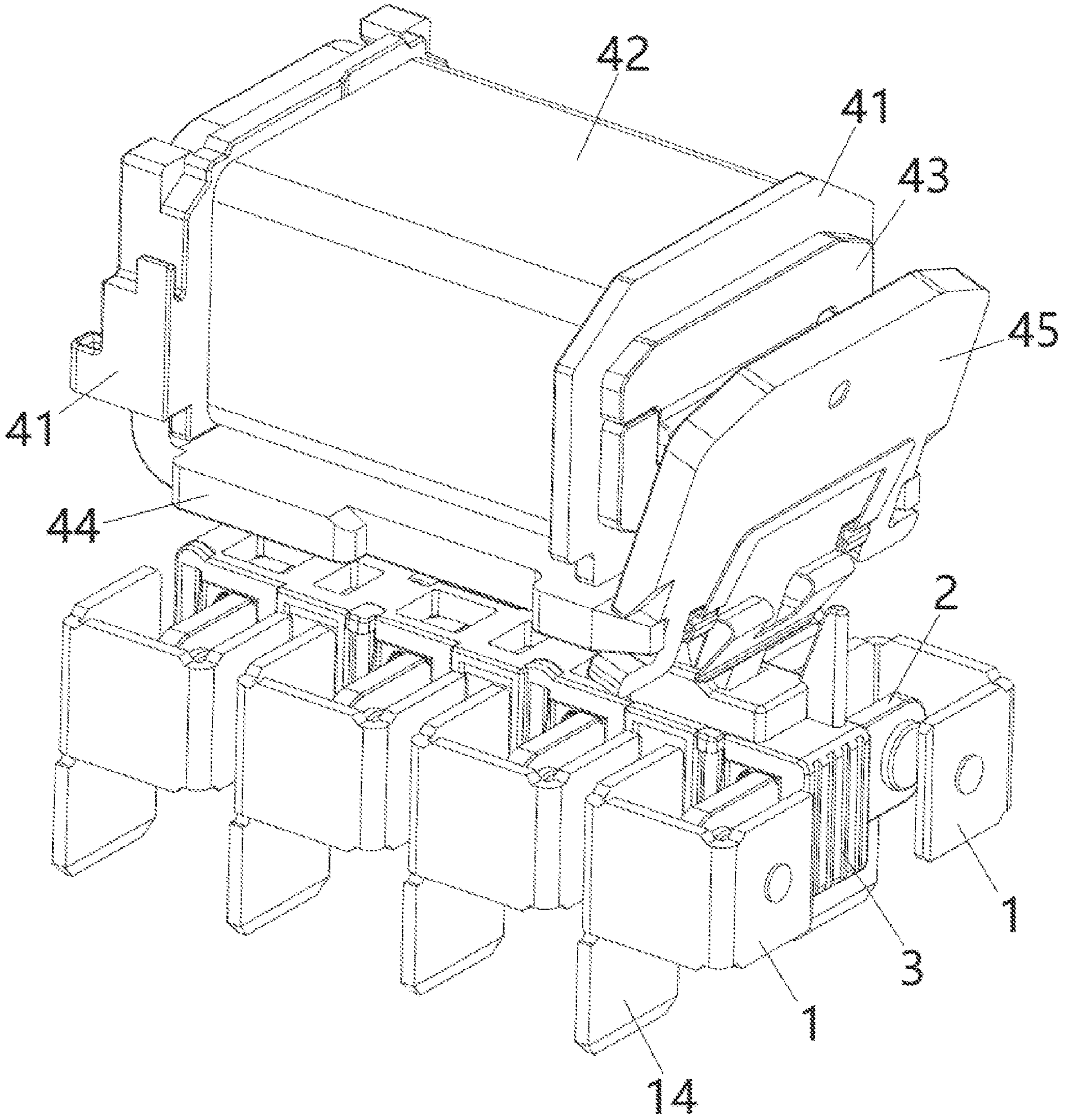
FIG. 4 is an illustrative perspective view of a coil drive assembly, a movable seat, and a terminal assembly of a relay according to an exemplary embodiment of the present invention.
Figure 5:
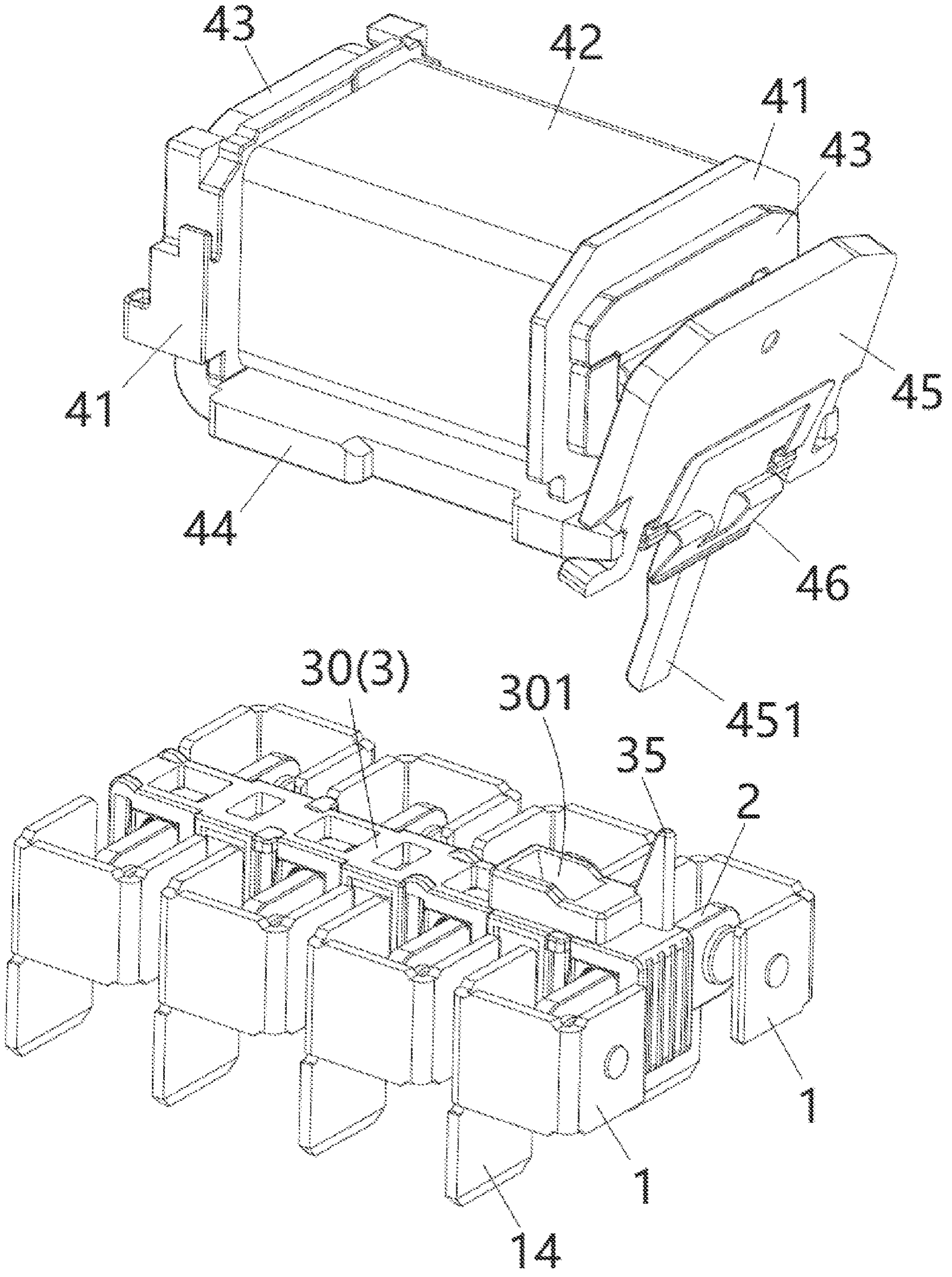
FIG. 5 is an illustrative perspective view of a coil drive assembly, a movable seat, and a terminal assembly of a relay according to an exemplary embodiment of the present invention, wherein the coil drive assembly is separated from the movable seat.

FIG. 1 is an illustrative perspective view of a relay according to an exemplary embodiment of the present invention. FIG. 2 is an illustrative perspective view of a relay according to an exemplary embodiment of the present invention, wherein the housing 8 is opened. FIG. 3 is an illustrative perspective view of a relay according to an exemplary embodiment of the present invention, wherein the housing 8 is removed. FIG. 4 is an illustrative perspective view of a coil drive assembly 4, a movable seat 3, and a terminal assembly 1, 2 of a relay according to an exemplary embodiment of the present invention. FIG. 5 is an illustrative perspective view of a coil drive assembly 4, a movable seat 3, and a terminal assembly 1, 2 of a relay according to an exemplary embodiment of the present invention, wherein the coil drive assembly 4 is separated from the movable seat 3.

As shown in FIGS. 1-13, in another exemplary embodiment of the present invention, a relay is disclosed. The relay comprises a terminal assembly 1, 2, a movable seat 3, a fixed seat 6, and an elastic member 9. The movable seat 3 is movably installed on the fixed seat 6 and can move back and forth in the first direction Y relative to the fixed seat. The elastic member 9 is installed on the movable seat 3. The static terminal 1 is fixed to the fixed seat 6. The elastic member 9 is compressed between the movable seat 3 and the movable terminal 2, allowing the movable terminal to float in the first direction Y relative to the movable seat.

Figure 14:
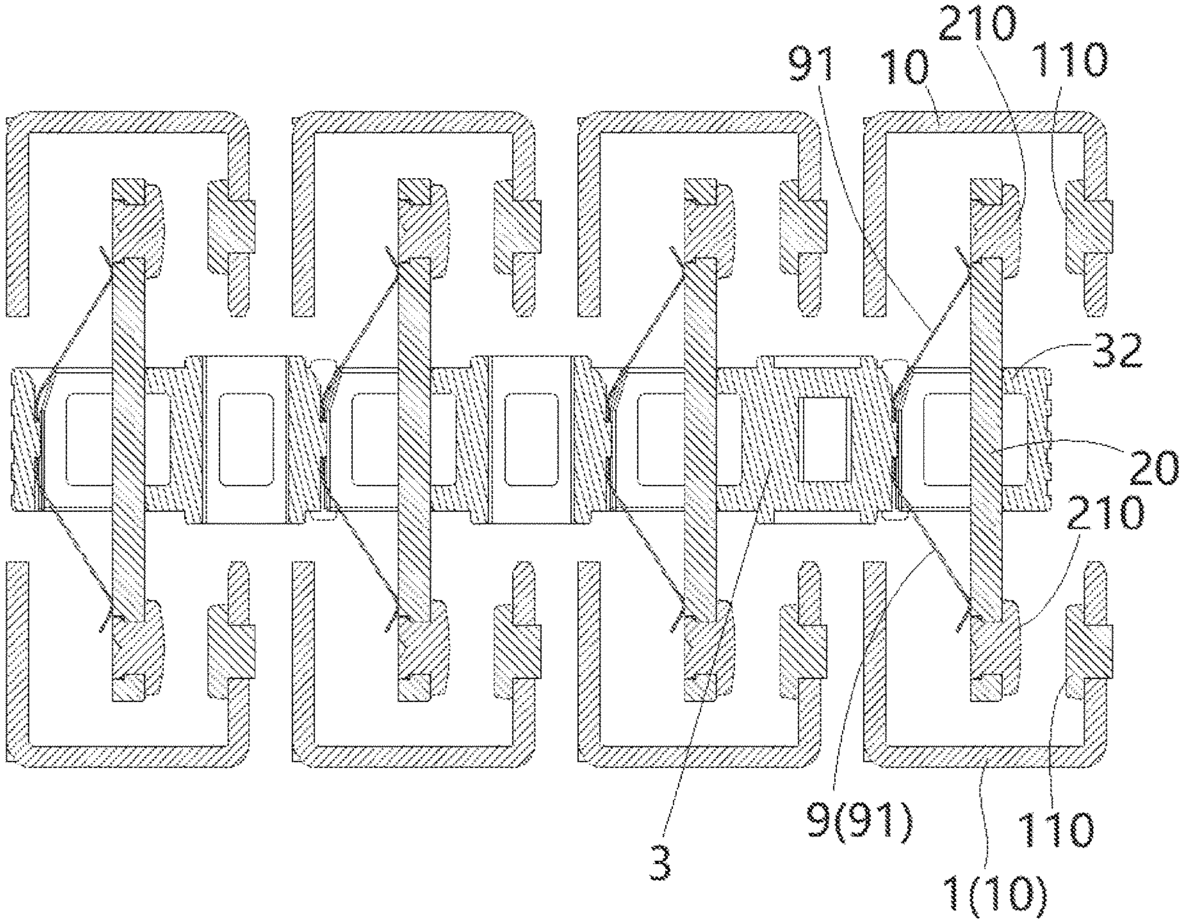
FIG. 14 is a plan view of a static terminal, a movable terminal, and an elastic member of a relay according to an exemplary embodiment of the present invention, wherein the movable terminal and static terminal are in an opened position.
Figure 15:
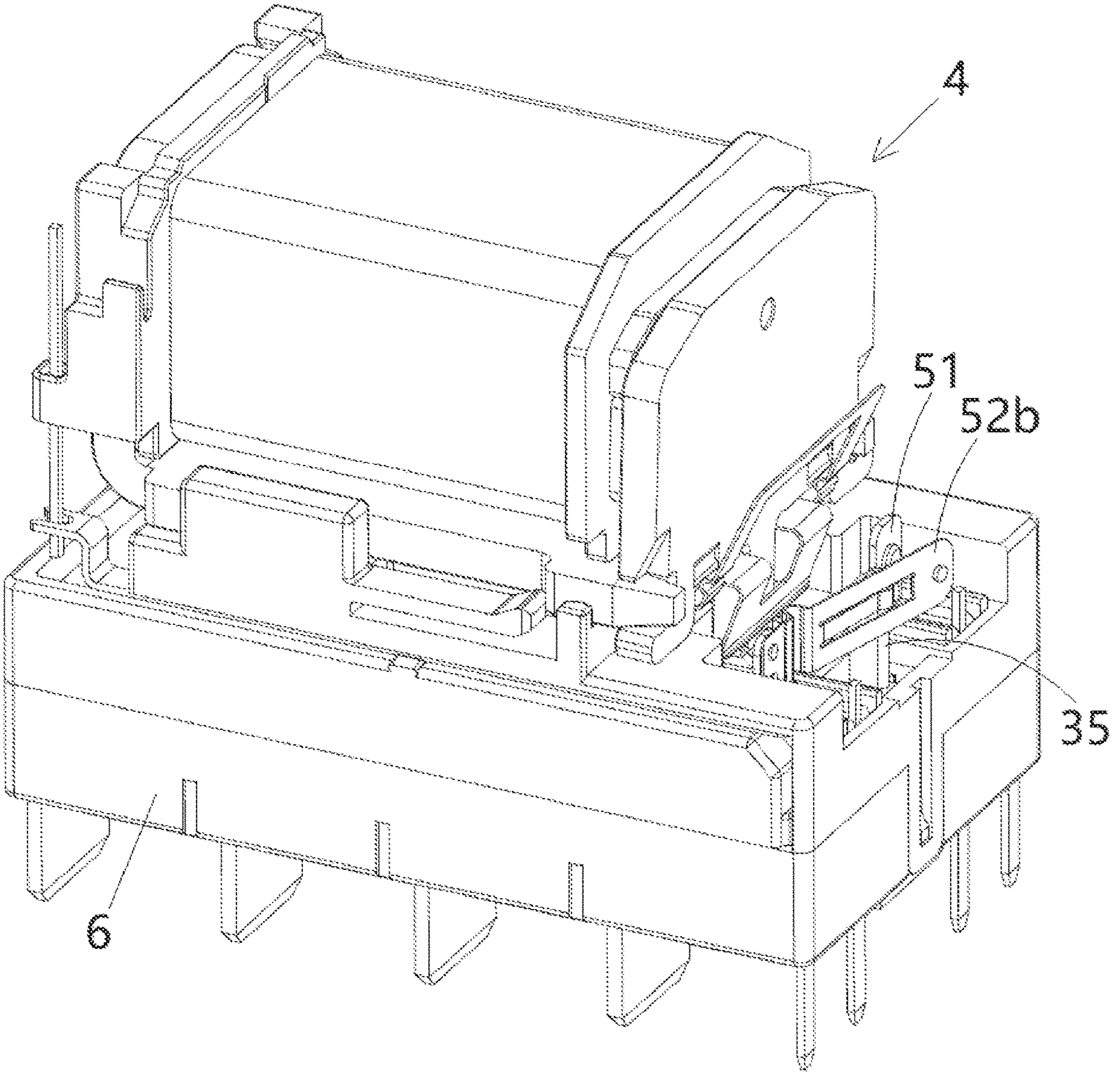
FIG. 15 is an illustrative perspective view of a relay according to an exemplary embodiment of the present invention, wherein the movable terminal and the static terminal are in a closed position.
Figure 16:
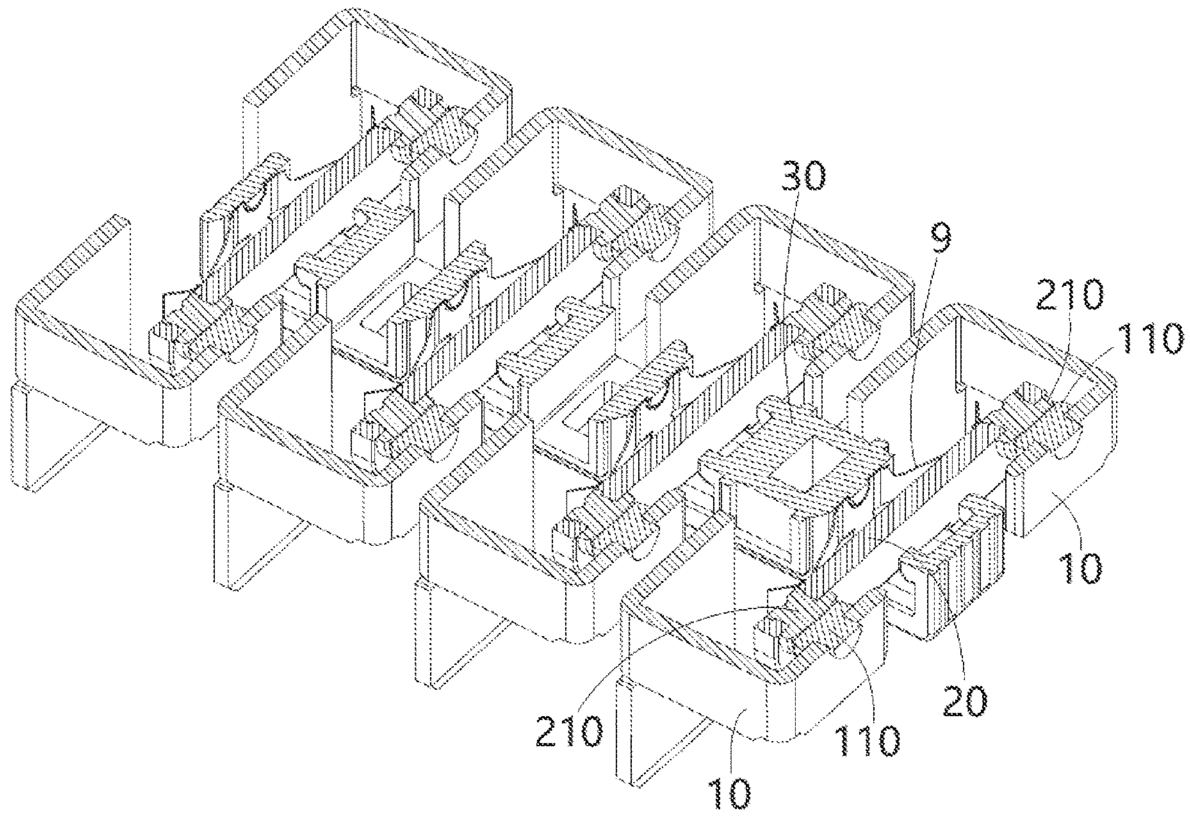
FIG. 16 is an illustrative perspective view of a static terminal, a movable terminal, and an elastic member of a relay according to an exemplary embodiment of the present invention, wherein the movable terminal and static terminal are in the closed position.
Figure 17:
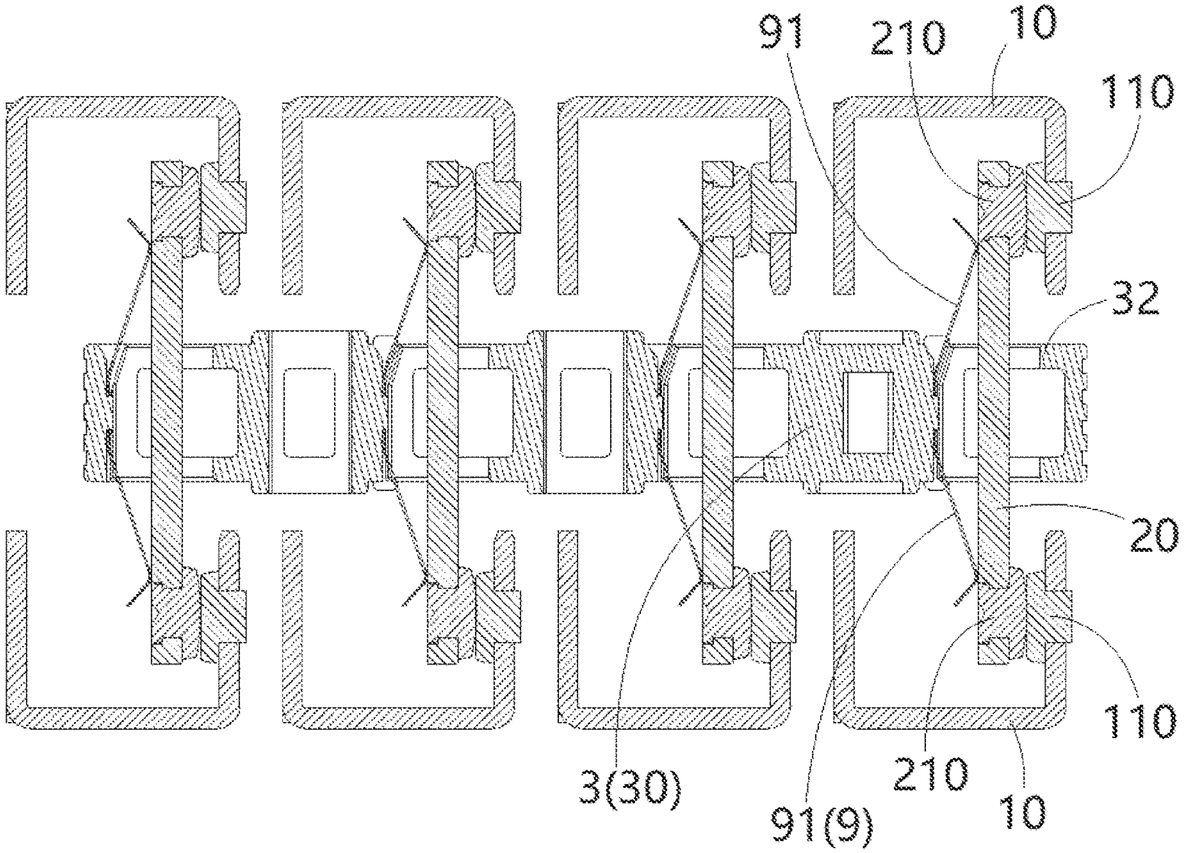
FIG. 17 is a plan view of a static terminal, a movable terminal, and an elastic member of a relay according to an exemplary embodiment of the present invention, wherein the movable terminal and static terminal are in the closed position.
Figure 18:
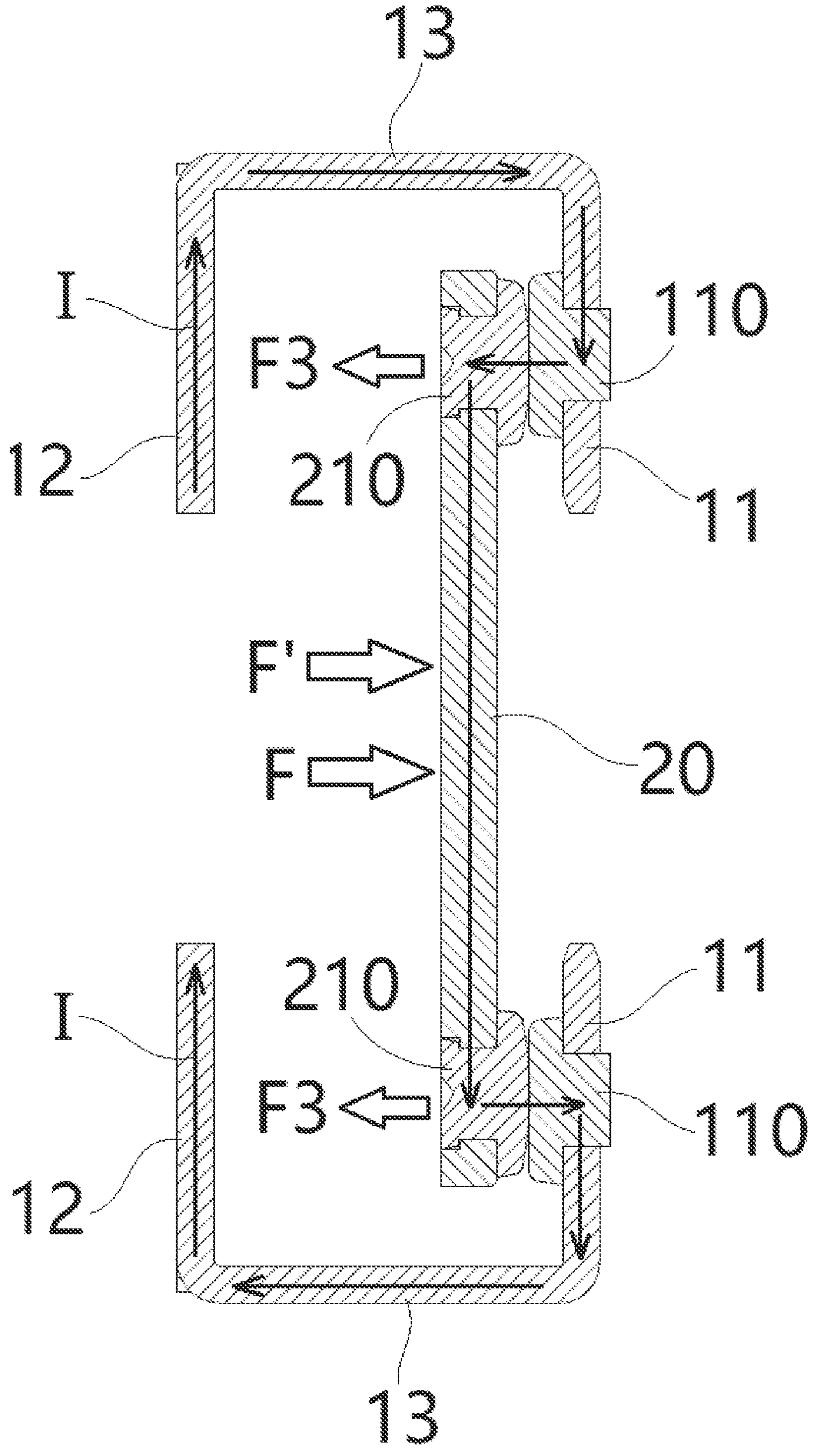
FIG. 18 is an illustrative view of the main circuit current flowing through the static and movable terminals of the relay according to an exemplary embodiment of the present invention.

FIG. 14 is a plan view of a static terminal 1, a movable terminal 2, and an elastic member 9 of a relay according to an exemplary embodiment of the present invention, wherein the movable terminal and static terminal are in the opened position. FIG. 15 is an illustrative perspective view of a relay according to an exemplary embodiment of the present invention, wherein the movable terminal and the static terminal are in the closed position. FIG. 16 is an illustrative perspective view of a static terminal 1, a movable terminal 2, and an elastic member 9 of a relay according to an exemplary embodiment of the present invention, wherein the movable terminal and static terminal are in the closed position. FIG. 17 is a plan view of a static terminal 1, a movable terminal 2, and an elastic member 9 of a relay according to an exemplary embodiment of the present invention, wherein the movable terminal and static terminal are in the closed position. FIG. 18 is an illustrative view of the main circuit current I flowing through the static terminal 1 and movable terminal 2 of the relay according to an exemplary embodiment of the present invention.

As shown in FIGS. 1-18, the movable seat 3 is used to push the movable terminal 2 between a closed position in electrical contact with the static terminal 1 and an opened position in electrical separation from the static terminal 1. When the movable terminal 2 is pushed to the closed position, the movable contact 210 is in electrical contact with the static contact 110, and the elastic member 9 applies a predetermined contact pressure F (see FIG. 18) on the movable terminal to ensure reliable electrical contact between the movable contact and the static contact. When the movable terminal 2 is pushed to the opened position, the movable contact 210 is electrically separated from the static contact 110.

In the illustrated embodiments, when the movable terminal 2 is pushed to the closed position, the main circuit current I will flow along the "n" shaped static terminal body 10 and generate a magnetic field. The direction of the electrodynamic force F' applied to the movable terminal 2 by the magnetic field is the same as the direction of the contact pressure F applied to the movable terminal by the elastic member 9, so as to overcome the Hohm repulsion F3 between the static contact 110 and the movable contact 210 together. Thus, it can effectively prevent the problem of movable contact 210 to rebound and be fused.

The elastic member 9 is in a herringbone or V shape. The elastic member 9 includes a fixed part 90 and a pair of elastic arms 91. The fixed part 90 is fixed to the movable seat 3. The pair of elastic arms 91 are respectively connected to both sides of the fixed part 90. The end parts 9*a* of a pair of elastic arms 91 slide against the back surfaces of two ends 221 of the movable terminal body 20 opposite to the movable contact 210, respectively. In this way, when the elastic arms 91 undergo elastic deformation, their end parts 9*a* can slide on the movable terminal body 20.

The movable seat 3 has a strip-shaped main body 30 extending in the first direction Y, forming a transverse penetrating receiving chamber 302 on the main body 30 of the movable seat 3. The fixed part 90 of the elastic member 9 and the installation part 222 of the movable terminal body 20 are accommodated in the receiving chamber 302 of the movable seat 3. The fixed part 90 of the elastic member 9 is fixed to the rear wall of the receiving chamber 302, and the installation part 222 of the movable terminal body 20 is slidably mated with the top and bottom walls of the receiving chamber 302.

The pair of elastic arms 91 are inclined forward or extend obliquely from the left and right sides of the fixed part 90 to the outside of the receiving chamber 302. The two ends 221 of the movable terminal body 20 extend from the left and right sides of the installation part 222 to the outside of the receiving chamber 302, respectively. A fixing hole 901 is formed in the fixed part 90, and a protrusion 311 is formed on the rear wall of the receiving chamber 302 of the movable seat 3, which is engaged into the fixing hole 901. The elastic member 9 further includes a pair of elastic snapping pieces 92, which are respectively connected to the upper and lower sides of the fixed part 90. A snapping slot 312 is formed on each of the top and bottom walls of the receiving chamber 302 of the movable seat 3, and the elastic snapping piece 92 is engaged into the snapping slot 312.

A guide slot 201 is formed on each of the upper and lower sides of the movable terminal body 20. The guide slots 201 on the upper and lower sides of the movable terminal body 20 are slidably mated with the top and bottom walls of the receiving chamber 302 to guide the movable terminal body to float in the first direction Y relative to the movable seat 3. Convex support parts 32 are formed on the left and right sides of the front wall of the receiving chamber 302 of the movable seat 3, respectively. When the movable terminal 2 is pushed to the opened position, the end part 9*a* of the elastic member 9 is pressed against the back surface of the movable terminal body 20, and the convex support part 32 is pressed against the front surface of the movable terminal body 20. When the movable terminal 2 is pushed to the closed position, the end part 9*a* of the elastic member 9 is pressed against the back surface of the movable terminal body 20, and the convex support part 32 is not in contact with the movable terminal body 20.

Figure 19:
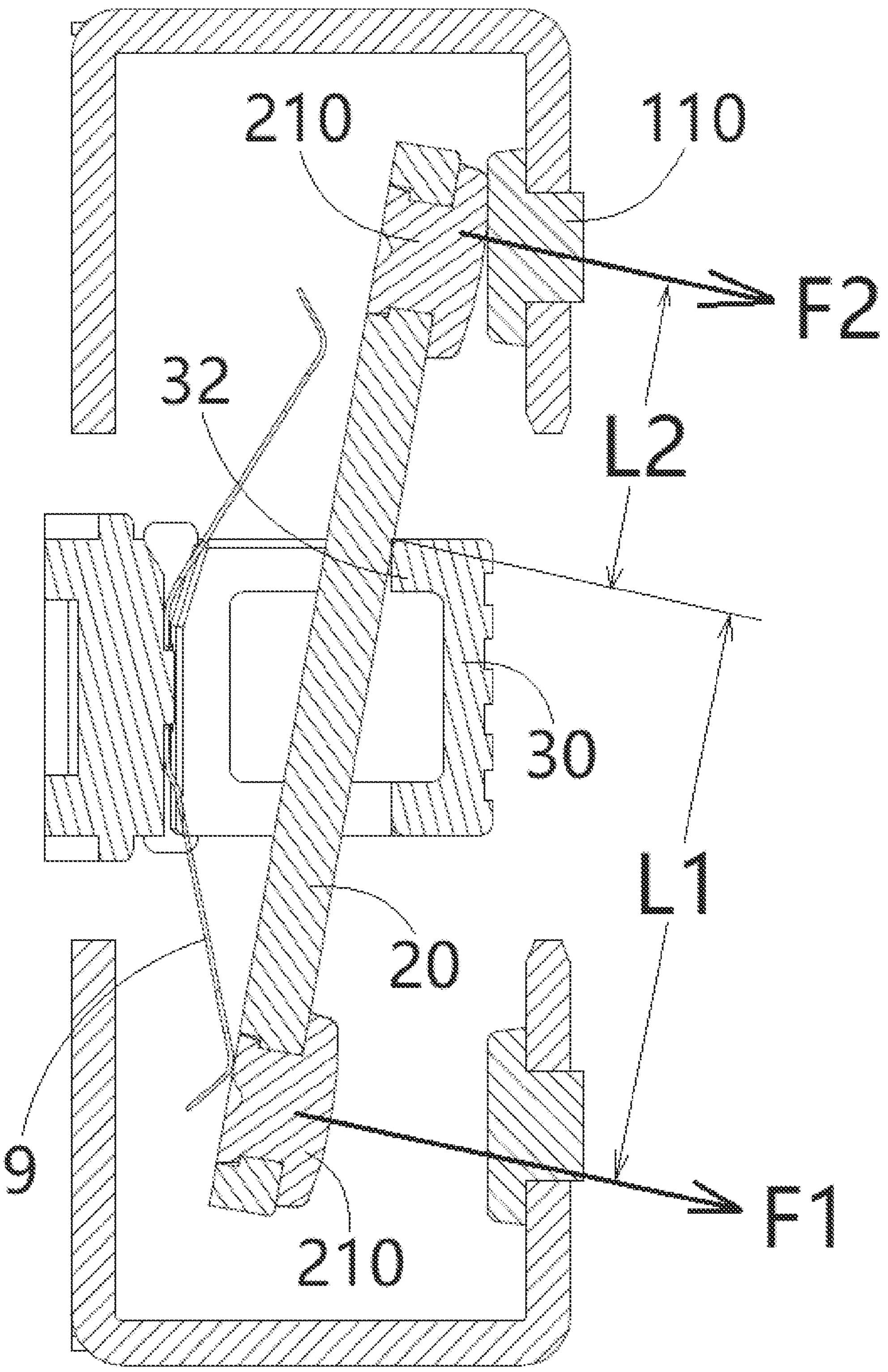
FIG. 19 is an illustrative view of a relay in which the movable and static contacts are fused according to an exemplary embodiment of the present invention.

FIG. 19 is an illustrative view of the movable contact 210 and static contact 110 of a relay in accordance with an exemplary embodiment of the present invention when they are fused. As shown in FIGS. 1 to 19, when the movable contact 210 at one end of the movable terminal 2 is fused with the static contact 110, during the movement of the movable terminal 2 towards the opened position, the movable terminal body 20 rotates with a convex support part 32 at one side of the movable seat 3 as the pivot. The distance L2 from the movable contact 210 at one end of the movable terminal 2 to the convex support part 32 is smaller than the distance L1 from the movable contact 210 at the other end of the movable terminal to the convex support part. When the product of the elastic force F1 applied to the other end of the movable terminal 2 by the elastic member 9 and the distance L1 is greater than the product of the fusion force F2 between the fused movable contact 210 and static contact 110 and the distance L2, the fused movable contact and static contact will be pulled apart. Therefore, in the aforementioned embodiments of the present invention, the fused movable contact 210 and static contact 110 can be separated in a timely manner without increasing the electromagnetic attraction applied by the coil assembly, thereby improving the safety and reliability of the relay.

In the illustrated embodiment, multiple receiving chambers 302 are formed in the movable seat 3. The multiple receiving chambers 302 are evenly spaced along the first direction Y. The relay includes multiple terminal assemblies 1, 2, as well as multiple elastic members 9 respectively corresponding to the movable terminals 2 of the multiple terminal assemblies. One movable terminal 2 and one elastic member 9 are installed in each receiving chamber 302 of the movable seat 3. In this way, multiple main circuits can be controlled simultaneously through the same relay.

The relay further comprises a bracket 7 and a coil drive assembly 4. The bracket 7 is installed on the top of fixed seat 6. The coil drive assembly 4 is installed on the top of the bracket 7 to drive the movable seat 3 to move forward and backward in the first direction Y.

The coil drive assembly 4 includes: 1) a coil framework 41; 2) a coil 42 which is wound on the outside of the coil framework 41; 3) a magnetic core 43 which is arranged inside the coil framework 41; 4) a magnetic yoke 44 is fixed to the end of the magnetic core 43 and is located outside the coil 42; 5) an armature 45 is movably connected to the magnetic yoke 44 to be able to rotate relative to the magnetic yoke 44; and 6) a spring 46 which is arranged between magnetic yoke 44 and armature 45 and is used to apply elastic reset force on the armature 45.

The armature 45 is movably connected to the movable seat 3, thereby enabling the movable seat to move forward and backward in the first direction Y through the armature. When coil 42 is energized, the armature 45 rotates under the action of electromagnetic attraction to drive the movable seat 3 forward to the closed position where the movable terminal 2 is in electrical contact with the static terminal 1. When the coil 42 deenergized, the armature 45 rotates under the elastic resetting force of spring 46 to drive the movable seat 3 to move backwards to the opened position where the movable terminal 2 is electrically separated from the static terminal 1.

A slot 301 is formed on the top of the main body 30 of the movable seat 3. A leg 451 is formed on the armature 45. The leg 451 can be movably inserted into the slot 301, allowing the armature 45 to be movably connected to the movable seat 3.

The relay further includes an auxiliary contact 51, 52. The auxiliary contact 51, 52 is used to detect the status between the movable terminal 2 and the static terminal 1 of the relay. In the illustrated embodiment, the auxiliary contact 51, 52 includes an auxiliary static contact 51 fixed to the fixed seat 6, and an auxiliary movable contact 52 fixed to the fixed seat and having a contact spring 52*b*. A protruding pushing part 35 is formed on the top of the main body 30 of the movable seat 3, which is used to push the contact spring 52*b* to an electrical contact position with the auxiliary static contact 51 or an electrical separation position from the auxiliary static contact 51.

When the movable seat 3 pushes the movable terminal 2 to the closed position, the pushing part 35 of the movable seat pushes the contact spring 52*b* of the auxiliary movable contact 52 to the electrical separation position. When the movable seat 3 pushes the movable terminal 2 to the opened position, the pushing part 35 does not contact the contact spring 52*b*, allowing the contact spring to automatically reset to the electrical contact position. However, the present invention is not limited to the illustrated embodiments. For example, in another exemplary embodiment of the present invention, when the movable seat 3 pushes the movable terminal 2 to the closed position, the pushing part 35 of the movable seat 3 pushes the contact spring 52*b* of the auxiliary movable contact 52 to the electrical contact position; When the movable seat 3 pushes the movable terminal 2 to the opened position, the pushing part 35 does not contact the contact spring 52*b*, allowing the contact spring 52*b* to automatically reset to the electrical separation position.

The relay further includes a housing 8, which is used to accommodate the terminal assembly 1, 2, the movable seat 3, the coil drive assembly 4, the auxiliary contact 51, 52, the fixed seat 6, and the bracket 7 of the relay. The electrical connection part 14 of the static terminal 1, the electrical connection pin 412*a* of the coil terminal 412 of the coil drive assembly 4, and the pins 51*a* and 52*a* of the auxiliary contacts 51, 52 extend from the bottom of the fixed seat 6 to respectively connect to the corresponding circuit. Among them, the electrical connection part 14 of the static terminal 1 is used for electrical connection to the main circuit, the electrical connection pin 412*a* of the coil terminal 412 is used for electrical connection to a coil circuit, and the pins 51*a* and 52*a* of the auxiliary contacts 51 and 52 are used for electrical connection to a detection circuit.

An elastic member 9 is also disclosed, which is used to apply contact pressure F to the movable terminal 2 of the relay. In the illustrated embodiment, the elastic member 9 includes a fixed part 90 and a pair of elastic arms 91. The fixed part 90 is fixed to the movable seat 3 of the relay. The pair of elastic arms 91 are respectively connected to both sides of the fixed part 90. The pair of elastic arms 91 extend a predetermined length by tilting forward from both sides of the fixed part 90, so that the elastic member 9 is in a herringbone shape. The end parts 9*a* of the pair of elastic arms 91 are used to lean against the two ends of the movable terminal 2 of the relay, respectively, to apply predetermined contact pressure on the two ends of the movable terminal 2.

The end parts 9*a* of the pair of elastic arms 91 are suitable for sliding against the surfaces of both ends of the movable terminal 2, so that the end parts 9*a* of the elastic arm 91 can slide on the surface of the movable terminal 2 when the elastic arm 91 undergoes elastic deformation. A fixing hole

901 is formed in the fixed part 90 of the elastic member 9, which is used to engage with a protrusion 311 formed on the movable seat 3.

The elastic member 9 further includes an elastic snapping piece 92, which is connected to the fixed part 90. The elastic snapping piece 92 is snapped into a snapping slot 312 formed on the movable seat 3. The fixed part 90 is in a plate shape, and a pair of elastic arms 91 are connected to the left and right sides of the fixed part 90, respectively. The elastic member 9 includes a pair of elastic snapping pieces 92, which are respectively connected to the upper and lower sides of the fixed part 90.

As shown in FIGS. 1-19, in another exemplary embodiment of the present invention, a relay is also disclosed. The relay comprises an elastic member 9, a terminal assembly 1, 2, a fixed seat 6, and a movable seat 3. Terminal assembly 1, 2 includes a movable terminal 2 and a pair of static terminals 1 symmetrically arranged at both ends of the movable terminal 2. The static terminal 1 is fixed to the fixed seat 6. The movable seat 3 is movably installed on the fixed seat 6 and can move back and forth in the first direction Y relative to the fixed seat 6. The movable terminal 2 and the elastic member 9 are installed on the movable seat 3, and the elastic member 9 is compressed between the movable seat 3 and the movable terminal 2, so that the movable terminal 2 can float in the first direction Y relative to the movable seat 3.

The static terminal 1 includes the static terminal body 10, the static contact 110, and the electrical connection part 14. The static terminal body 10 is in an "n" shape, and includes a first side plate 11, a second side plate 12 which is spaced from and opposite to the first side plate 11, and a third side plate 13 connected between the first side plate 11 and the second side plate 12. The static contact 110 is fixed on the first side plate 11. The electrical connection part 14 extends downwards from the bottom of the second side plate 12 for electrical connection to the main circuit.

The movable terminal 2 includes a movable terminal body 20 and two movable contacts 210. Two movable contacts 210 are respectively fixed on both ends of the movable terminal body 20. The static terminal body 10 defines an accommodating space 101. The two movable contacts 210 of the movable terminal 2 are respectively located in the accommodating spaces of the two static terminals 1 and respectively face the static contacts 110 of the two static terminals.

The movable seat 3 is used to push the movable terminal 2 to move between the closed position in electrical contact with the static terminal 1 and the opened position in electrical separation from the static terminal. When the movable terminal 2 is pushed to the closed position, the movable contact 210 is in electrical contact with the static contact 110. The elastic member 9 applies a predetermined contact pressure F1 on the movable terminal 2 to ensure reliable electrical contact between the movable contact 210 and the static contact 110. When the movable terminal 2 is pushed to the opened position, the movable contact 210 is electrically separated from the static contact 110.

When the movable terminal 2 is pushed to the closed position, the main circuit current I will flow along the "n" shaped static terminal body 10 and generate a magnetic field. The direction of the electrodynamic force F' applied to the movable terminal 2 by the magnetic field is the same as the direction of the contact pressure F applied by the elastic member 9 to the movable terminal 2, so as to overcome the Hohm repulsion F3 between the static contact 110 and the movable contact 210 together.

The movable seat 3 has a strip-shaped main body 30 extending in the first direction Y, forming a transverse penetrating receiving chamber 302 on the main body 30 of the movable seat 3. The fixed part 90 of the elastic member 9 and the installation part 222 of the movable terminal body 20 are accommodated in the receiving chamber 302 of the movable seat 3. The fixed part 90 of the elastic member 9 is fixed to the rear wall of the receiving chamber 302, and the installation part 222 of the movable terminal body 20 is slidably mated with the top and bottom walls of the receiving chamber 302.

In the illustrated embodiments, a pair of elastic arms 91 are inclined forward from the left and right sides of the fixed part 90 to the outside of the receiving chamber 302. The two ends 221 of the movable terminal body 20 extend from the left and right sides of the installation part 222 to the outside of the receiving chamber 302, respectively. A protrusion 311 is formed on the rear wall of the receiving chamber 302 of the movable seat 3, and the protrusion 311 is engaged into a fixing hole 901 formed in the elastic member 9. A snapping slots 312 is formed on each of the top and bottom walls of the receiving chamber 302 of the movable seat 3, and the snapping slot 312 is engaged with the elastic snapping piece 92 on the elastic member 9.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An elastic member adapted to apply a contact pressure to a movable terminal of a relay, comprising:

a fixed part adapted to be fixed to a movable seat of the relay, the fixed part is plate shaped;

a pair of elastic arms connected to respective sides of the fixed part and extending obliquely therefrom, the pair of elastic arms are connected to respective left and right sides of the fixed part, end parts of the pair of elastic arms adapted to abut against two ends of the movable terminal of the relay and apply a predetermined contact pressure thereon; and a pair of elastic snapping pieces connected to respective ones of upper and lower sides of the fixed part, the elastic snapping pieces are each adapted to be engaged into a snapping slot formed on the movable seat.

2. The elastic member according to claim 1, wherein a fixing hole adapted to receive a protrusion formed on the movable seat is formed in the fixed part.

3. A relay, comprising:

an elastic member, including:

a fixed part adapted to be fixed to a movable seat of the relay; and a pair of elastic arms connected to respective sides of the fixed part and extending obliquely therefrom;

a terminal assembly, including a movable terminal and a pair of static terminals symmetrically arranged at both ends of the movable terminal, end parts of the pair of elastic arms abut against two ends of the movable terminal and apply a predetermined contact pressure thereon;

a fixed seat on which the static terminals are fixed;

a movable seat which is movably installed on the fixed seat and movable in a first direction relative to the fixed seat, the movable terminal and the elastic member are installed on the movable seat, and the elastic member is compressed between the movable seat and the movable terminal, so that the movable terminal is floatable in the first direction relative to the movable seat;

a bracket installed on a top of the fixed seat; and a coil drive assembly which is installed on a top of the bracket and is used to drive the movable seat to move forward and backward along the first direction.

4. The relay according to claim 3, wherein each static terminal comprises:

an n-shaped static terminal body, including:

a first side plate;

a second side plate spaced from and opposite to the first side plate; and a third side plate connected between the first side plate and the second side plate;

a static contact fixed on the first side plate; and an electrical connection part extending downwards from the bottom of the second side plate and adapted to electrically connect to a main circuit.

5. The relay according to claim 4, wherein the movable terminal comprises:

a movable terminal body; and two movable contacts fixed on respective ends of the movable terminal body, each static terminal body defines an accommodation space, and the two movable contacts of the movable terminal are located in respective ones of accommodation space of the pair static terminals and respectively face the static contacts of the pair of static terminals.

6. The relay according to claim 5, wherein:

the movable seat biases the movable terminal to move between a closed position in electrical contact with the static terminal and an opened position in electrical separation from the static terminal;

when the movable terminal is biased to the closed position, the movable contact is in electrical contact with the static contact, and the elastic member applies a predetermined contact pressure on the movable terminal to ensure reliable electrical contact between the movable contact and the static contact; and when the movable terminal is biased to the opened position, the movable contact is electrically separated from the stationary contact.

7. The relay according to claim 6, wherein, when the movable terminal is pushed to the closed position:

a main circuit current will flow along the static terminal body and generate a magnetic field; and a direction of an electrodynamic force applied to the movable terminal by the magnetic field is the same as a direction of the contact pressure applied to the movable terminal by the elastic member, so as to overcome a repulsion force between the static contact and the movable contact together.

8. The relay according to claim 6, wherein:

the movable seat has a main body extending along the first direction, a receiving chamber is formed in and transversally runs through the main body of the movable seat;

the fixed part of the elastic member and an installation part of the movable terminal body are accommodated in the receiving chamber of the movable seat; and the fixed part of the elastic member is fixed to a rear wall of the receiving chamber, and the installation part of the movable terminal body is slidably mated with top and bottom walls of the receiving chamber.

9. The relay according to claim 8, wherein:

the pair of elastic arms extend diagonally forward from respective left and right sides of the fixed part to the outside of the receiving chamber; and two ends of the movable terminal body extend from left and right sides of the installation part to the outside of the receiving chamber, respectively.

10. The relay according to claim 8, wherein:

a protrusion is formed on the rear wall of the receiving chamber of the movable seat, and the protrusion is engaged into a fixed hole formed in the elastic member; and a snapping slot is formed on each of the top and bottom walls of the receiving chamber of the movable seat, and the snapping slot is engaged with an elastic snapping piece on the elastic member.

11. The relay according to claim 8, wherein a guide slot is formed on each of upper and lower sides of the movable terminal body, and the guide slots on the upper and lower sides of the movable terminal body are respectively slidably mated with the top and bottom walls of the receiving chamber to guide the movable terminal body to float relative to the movable seat in the first direction.

12. The relay according to claim 8, wherein:

a convex support part is formed on each of left and right sides of a front wall of the receiving chamber of the movable seat;

when the movable terminal is pushed to the opened position, the end parts of the elastic member lean against a back surface of the movable terminal body, and the convex support parts lean against a front face of the movable terminal body; and when the movable terminal is pushed to the closed position, the end parts of the elastic member lean against the back surface of the movable terminal body, and the convex support parts are not in contact with the movable terminal body.

13. The relay according to claim 12, wherein:

when the movable contact at one end of the movable terminal is fused with the static contact, during the movement of the movable terminal towards the opened position, the movable terminal body rotates with the convex support part on one side of the movable seat as a pivot;

a distance L2 from the movable contact at one end of the movable terminal to the convex support part is less than a distance L1 from the movable contact at the other end of the movable terminal to the convex supporting part;

when the product of the elastic force F1 applied to the other end of the movable terminal by the elastic member and the distance L1 is greater than the product of a fusion force F2 between the fused movable contact and static contact and the distance L2, the fused movable contact and static contact are pulled apart.

14. The relay according to claim 8, wherein:

multiple receiving chambers are formed in the movable seat, the multiple receiving chambers are evenly spaced along the first direction;

the relay includes multiple terminal assemblies and multiple elastic members corresponding to the movable terminals in the multiple terminal assemblies; and one movable terminal and one elastic member are installed in each receiving chamber of the movable seat.

15. The relay according to claim 3, further comprising an auxiliary contact, including:

an auxiliary static contact fixed to the fixed seat; and an auxiliary movable contact fixed to the fixed seat and having a contact spring, a pushing part is formed on the top of the main body of the movable seat and is adapted to push the contact spring to an electrical contact position with the auxiliary static contact or an electrical separation position from the auxiliary static contact.

16. The relay according to claim 15, further comprising a housing accommodating the terminal assembly, the movable seat, the coil drive assembly, the auxiliary contact, the fixed seat, and the bracket of the relay, the electrical connection part of the static terminal, an electrical connection pin of a coil terminal of the coil drive assembly, and the pins of the auxiliary contact extend out of a bottom of the fixed seat.

17. An elastic member adapted to apply a contact pressure to a movable terminal of a relay, comprising:

a fixed part adapted to be fixed to a movable seat of the relay; and a pair of elastic arms connected to respective sides of the fixed part and extending obliquely therefrom, end parts of the pair of elastic arms adapted to abut against two ends of the movable terminal of the relay and apply a predetermined contact pressure thereon, the end parts of the pair of elastic arms are adapted to slide against surfaces of the two ends of the movable terminal as the elastic arm undergoes elastic deformation.

18. A relay, comprising:

an elastic member, including:

a fixed part adapted to be fixed to a movable seat of the relay; and a pair of elastic arms connected to respective sides of the fixed part and extending obliquely therefrom;

a terminal assembly, including:

a movable terminal including:

a movable terminal body; and two movable contacts fixed on respective ends of the movable terminal body; and a pair of static terminals symmetrically arranged at both ends of the movable terminal, end parts of the pair of elastic arms abut against two ends of the movable terminal and apply a predetermined contact pressure thereon, each static terminal comprises:

an n-shaped static terminal body, including:

a first side plate;

a second side plate spaced from and opposite to the first side plate; and a third side plate connected between the first side plate and the second side plate, each static terminal body defines an accommodation space, and the two movable contacts of the movable terminal are located in respective ones of accommodation space of the pair static terminals and respectively face the static contacts of the pair of static terminals;

a static contact fixed on the first side plate; and an electrical connection part extending downwards from the bottom of the second side plate and adapted to electrically connect to a main circuit;

a fixed seat on which the static terminals are fixed; and a movable seat which is movably installed on the fixed seat and movable in a first direction relative to the fixed seat, the movable terminal and the elastic member are installed on the movable seat, and the elastic member is compressed between the movable seat and the movable terminal, so that the movable terminal is floatable in the first direction relative to the movable seat, the movable seat biases the movable terminal to move between a closed position in electrical contact with the static terminal and an opened position in electrical separation from the static terminal such that:

when the movable terminal is biased to the closed position, the movable contact is in electrical contact with the static contact, and the elastic member applies a predetermined contact pressure on the movable terminal to ensure reliable electrical contact between the movable contact and the static contact; and when the movable terminal is biased to the opened position, the movable contact is electrically separated from the stationary contact.

19. A relay, comprising:

an elastic member, including:

a fixed part adapted to be fixed to a movable seat of the relay; and a pair of elastic arms connected to respective sides of the fixed part and extending obliquely therefrom;

a terminal assembly, including a movable terminal and a pair of static terminals symmetrically arranged at both ends of the movable terminal, end parts of the pair of elastic arms abut against two ends of the movable terminal and apply a predetermined contact pressure thereon;

a fixed seat on which the static terminals are fixed; and a movable seat which is movably installed on the fixed seat and movable in a first direction relative to the fixed seat, the movable terminal and the elastic member are installed on the movable seat, and the elastic member is compressed between the movable seat and the movable terminal, so that the movable terminal is floatable in the first direction relative to the movable seat;

an auxiliary contact, including:

an auxiliary static contact fixed to the fixed seat; and an auxiliary movable contact fixed to the fixed seat and having a contact spring, a pushing part is formed on the top of the main body of the movable seat and is adapted to push the contact spring to an electrical contact position with the auxiliary static contact or an electrical separation position from the auxiliary static contact.

* * * * *